(12) United States Patent
Tsenter

(10) Patent No.: US 6,167,721 B1
(45) Date of Patent: Jan. 2, 2001

(54) ELECTROCHEMICAL HYDROGEN PUMP AND USES THEREOF FOR HEAT EXCHANGE APPLICATIONS

(75) Inventor: Boris Tsenter, Norcross, GA (US)

(73) Assignee: Borst, Inc., Chamblee, GA (US)

( * ) Notice: Under 35 U.S.C. 154(b), the term of this patent shall be extended for 0 days.

(21) Appl. No.: 09/353,458

(22) Filed: Jul. 14, 1999

Related U.S. Application Data

(60) Provisional application No. 60/092,723, filed on Jul. 14, 1998.

(51) Int. Cl.[7] .................................................. F25B 17/08
(52) U.S. Cl. .............................. 62/480; 62/3.1; 62/259.2
(58) Field of Search ........................... 62/259.2, 3.1, 62/480

(56) References Cited

U.S. PATENT DOCUMENTS

| | | | |
|---|---|---|---|
| 5,349,499 | * | 9/1994 | Yamada et al. ...................... 361/700 |
| 5,787,713 | * | 8/1998 | Russo ................................... 62/48.1 |
| 5,966,957 | * | 10/1999 | Malhammer et al. .............. 62/259.2 |
| 6,055,814 | * | 5/2000 | Song ....................................... 62/3.2 |
| 6,055,815 | * | 5/2000 | Peterson ................................. 62/3.7 |
| 6,092,372 | * | 5/2000 | Russo ................................... 62/48.1 |

* cited by examiner

*Primary Examiner*—William Doerrler
*Assistant Examiner*—Mark Shulman
(74) *Attorney, Agent, or Firm*—Benesch, Friedlander, Coplan & Aronoff LLP; Raymond A. Miller

(57) ABSTRACT

An electrochemical heat exchanger which includes a housing, hydrogen producing/consuming portions separated by a proton exchange membrane and a gas space designed to contact an object in need of cooling. The gas space includes either hydrogen or a liquid gas which is placed in thermal contact with an item to be cooled. The hydrogen gas or liquid coolant exchanges heat with the element to be cooled and is constantly replenished by hydrogen or liquid coolant forced through the heat exchanger by a pressure differential created between the respective hydrogen electrodes.

15 Claims, 2 Drawing Sheets

ELECTROCHEMICAL HYDROGEN PUMP AND USES THEREOF FOR HEAT EXCHANGE APPLICATIONS

This application claims the benefit of the earlier filing date of provisional application number 60/092,723 filed on Jul. 14, 1998.

FIELD OF THE INVENTION

This invention relates generally to a hydrogen pump, more particularly to a hydrogen pump which includes a proton exchange membrane and even more particularly to a heat exchange system which utilizes an electrochemical hydrogen pump which includes symmetrical hydrogen electrodes and a proton exchange membrane.

BACKGROUND OF THE INVENTION

Electrochemical cells in which a chemical reaction is forced by adding electrical energy are called electrolytic cells. Central to the operation of any cell is the occurrence of oxidation and reduction reactions which produce or consume electrons. These reactions generally take place at electrode/solution interfaces, where the electrodes must be good electronic conductors and the solution should have high ion conductivity. In operation, a cell is connected to an external voltage source, and electric charge is transferred by electrons between the anode and the cathode through the external circuit. To complete the electric circuit through the cell, an additional mechanism must exist for internal charge transfer. This is provided by one or more electrolytes, which support charge transfer by ionic conduction.

The simplest electrochemical cell consists of at least two electrodes and one or more electrolytes. The electrode at which the electron producing oxidation reaction occurs is the anode. The electrode at which an electron consuming reduction reaction occurs is called the cathode. The direction of the electron flow in the external circuit is always from anode to cathode. In order to drive the electrolysis reaction, it is necessary to apply electric power to the cell electrodes. The electrodes are connected through the electrical leads to an external source of electric power with the polarity being selected to induce the electrolyte anion flow to the anode and the cation flow to the cathode.

Generally speaking, the anode and cathode are made of a substrate material, such as titanium, graphite, or the like, coated with a catalyst such as lead dioxide or other known materials. The selection of a substrate and catalyst is determined by the particular electrode reactions which are to be optimized in a given situation. As a rule a cathode and an anode produce different products. Classically, these products are hydrogen and oxygen.

Generally, the electrolyte is a liquid which is conductive of ions. The most common applications are fuel cells. In fuel cells, proton exchange membranes are used as electrolytic and catalyst support for providing a reaction of hydrogen oxidation on the one side of membrane and oxygen reduction on the other side. This combination of membrane and electrodes can be called a Membrane Electrode Assembly (MEA).

Cooling of electronic devices utilizing a vapor compression refrigeration cycle known in the art. Vapor compression cooling uses the thermodynamic principles associated with phase transfer, specifically the latent heat of vaporization and the entropy of evaporation of a working fluid. Compression of a vaporous working fluid can occur through mechanical or electrochemical means. Mechanical compression requires a relatively large, heavy, mechanical compressor having a great number of parts which are often bulky and susceptible to wear. Electrochemical compressors have been proposed to drive Joule-Thomson refrigeration cycles. (See, for example, U.S. Pat. No. 4,593,534 which is hereby incorporated by reference in its entirety.) This type of compressor is preferred since it has no moving parts, is vibration free, and has the potential for long life and reliability.

As described in U.S. Pat. No. 4,523,635, which is hereby expressly incorporated by reference in its entirety herein, it is known that certain metals and alloys exothermically occlude hydrogen to form a metal hydride and the metal hydride reversibly releases hydrogen. Such a heat pump can be constructed by providing a first metal hydride ($M_1H$) and a second metal hydride ($M_2H$) which have different equilibrium dissociation pressures at the same temperature, in closed receptacles capable of effecting heat exchange with a heat medium, and connecting these receptacles with a common gas space conduit so as to permit transfer of hydrogen therebetween. However, these type of heat exchange devices rely on differences in equilibrium dissociation pressures of the respective metal hydrides. The metal hydrides utilized must be able to occlude and release hydrogen at very substantial rates, and metal hydrides of this type are very expensive to manufacture and utilize. Additionally, it is difficult to efficiently control the production and consumption of hydrogen during operation of the heat exchanger using principles of disassociation of hydrogen from metal hydrides.

U.S. Pat. Nos. 5,768,906 and 5,746,064 which are both owned by Applicant and are both incorporated herein by reference thereto teach an electrochemical heat exchanger which utilizes hydrogen production and consumption to effectuate heat transfer. These electrodes connected with a power supply produce and consume hydrogen depending on the power supply's polarity. Hydrogen can provide heat exchange itself, but in general the hydrogen gas pushes liquid causing it to move back and forth. This electrochemical "pump," although very effective, has certain disadvantages for heat exchanging function. These disadvantages relate to the need for undesirable electrolyte in the electrochemical cell, relatively low rate of hydrogen production and consumption, and relatively short cycle life.

SUMMARY OF THE INVENTION

In accordance with the present invention, there is provided an electrochemical heat exchanger which contains one or more electrochemical cells which produce and consume hydrogen gas in a common gas space within a closed receptacle or sealed chamber, the gas space being capable of effecting heat exchange with an element to be temperature regulated and a gas or liquid contained within the chamber. Preferably, the electrochemical heat exchanger is comprised of an electrochemical cell(s) which include an anode and a cathode sharing a common gas space. It is preferable that the cell include a proton exchange membrane preferably situated between the anode and cathode and it is more preferable to utilize hydrogen electrodes as both the cathode and anode. Hydrogen electrodes are capable of both generating and consuming hydrogen.

The reactions which occur at the hydrogen cathode:

$$2H^+ + 2e^- \rightarrow H_2 \tag{1}$$

And at the hydrogen anode:

$$H_2 \rightarrow 2H^+ + 2e^- \tag{2}$$

The net product of the overall reaction is heat. Hydrogen is produced at the cathode and hydrogen is consumed at the anode.

Applications of the presently disclosed heat exchanger include cooling electrical machines or devices such as electrical generators and transformers, and the refrigeration art wherein metal hydrides having different dissociation constants are used to transfer hydrogen between cells. By way of example only U.S. Pat. Nos. 4,523,635 and 5,445,217, both of which are hereby expressly incorporated by reference in their entireties provide possible applications of the present invention.

Hydrogen as discussed herein is very useful as a cooling agent. Hydrogen has a thermoconductivity value seventeen times that of air. However, hydrogen does have some limitations when compared to liquid cooling agents. For example, hydrogen has a low magnitude of specific capacity which may make it less appealing for larger volume applications. For larger volume applications it may be more energy efficient to use hydrogen as a pump or as a means to move a liquid cooling agent.

The present invention may utilize hydrogen produced during charging of a cell to regulate the temperature of an element to be temperature regulated such as a microchip. When using the hydrogen gas produced as a cooling agent it is preferable to "move" and replenish the gas so that it transfers heat absorbed to the environment and maintains an ambient temperature, therefore, utilizing the hydrogen produced to create a pressure differential between electrochemical cells.

One embodiment of the present invention is a heat pump constructed such that a first hydrogen electrode and a second hydrogen electrode are in separate chambers (e.g., separated by a proton exchange membrane) connected by a common gas space or conduit so as to permit transfer of hydrogen therebetween.

An alternative embodiment of the present invention utilizes the hydrogen produced in an electrochemical cell to pump or push a liquid cooling agent in order to place the liquid in thermal contact with a body, element or device to be cooled.

In the preferred embodiment, the electrochemical heat exchanger of the present invention provides an electrochemical cell having a hydrogen cathode and anode, which is integrally formed with a proton exchange membrane. Preferably, the heat exchanger includes a heat exchanger chamber disposed between the anode and the cathode. It is only necessary for the heat exchange chamber to be in heat transfer relationship with the element to be temperature regulated, thus, the heat exchanger chamber is capable of accommodating an element to be cooled either inside the heat exchange chamber or on a surface area that is in thermal contact with the heat exchange chamber.

A pressure differential is established between the two hydrogen electrodes through production of hydrogen by applying a positive polarity to the first hydrogen electrode of one cell and consuming hydrogen by applying a negative polarity to the second hydrogen electrode of the other cell. The power supply can be a reverse-polarity power supply capable of switching the direction of current applied which reverses the function of the respective cells. The poles of the power supply should be designed to be switched if a voltage difference across the hydrogen electrodes is within the range of about 100 mV to 600 mV. When liquid is used as a heat carrier, the polarity should be switched so that each of the electrodes alternatively produce and consume gas. The power supply may be a battery or a rectifier or any other electric source capable of delivering direct current.

The coolant liquid flow or hydrogen flow depends upon the applied current value established between the two electrodes. Liquid or hydrogen thermal contact with a heated element (for example a microchip) removes heat from the heated element and transfers heat, preferably to a heat sink. The heated element is normally located external to the heat exchanger, and the heat is transferred through a metal or thermally conductive material which comprises the heat exchange chamber.

The moving force for hydrogen transfer is provided as a result of the difference in hydrogen pressure between the producing and consuming cells. As stated above, the rate of heat being removed is dependent upon the rate of hydrogen flow and, therefore, the applied current. The voltage value on the cell (V) depends upon the impedance of the internal cell. The relationship between current (I) and hydrogen flow (F) is directly correlated to the pressure differential in the cell as defined by Faraday's Law:

$$F = 0.11 \times I \text{ ml/sec} \tag{3}$$

The required power value W for providing hydrogen flow, F, is:

$$W = V \times F / 0.11 \tag{4}$$

where V is expressed in volts, and W in watts. In one embodiment the hydrogen is produced by the hydrogen cathode and passes through the gas conduit to allow thermal contact with the device to be cooled and is consumed in another cell. Alternatively, the hydrogen produced forces a liquid or gas cooling agent through a pipe, conduit, or chamber to allow thermal exchange between the element to be cooled and the liquid cooling agent. In this case, the force resulting from hydrogen gas production meets little resistance due to the fact that an equal or substantially equal amount of hydrogen is being consumed in the consuming cell.

It is possible to use a plurality of cells electrically connected in a series. In this case the hydrogen flow, F, would be equal to:

$$F = 0.11 \times N \times I \text{ ml/sec} \tag{5}$$

with N being the total number of cells.

The amount of transferred heat (W) can be calculated as per expressions:

$$W = 0.5 \times I \times N \tag{6}$$

if water is used as carrier; and $$W = 1.3 \times 10^{-3} \times I \times N \tag{7}$$

if hydrogen is used as heat carrier.

From formulas (6) and (7) we can see that a liquid carrier removes heat more effectively. However, there are some applications in which a gas carrier is preferred.

The advantages of the present invention will be apparent from the attached drawings and the disclosure of the preferred embodiments that follow.

One feature of the invention resides broadly in an electrochemical heat exchanger comprised of: a first hydrogen electrode having a first gas space; a second hydrogen electrode having a second gas space; and a solid electrolyte electrically connecting said first and second hydrogen electrode, said first and second gas spaces being in communication with a heat exchange member. The heat exchange member is a chamber interposed between said first and second gas spaces. The solid electrolyte is a proton exchange membrane. The chamber is at least partially filled with a heat carrier. The heat carrier is liquid. The liquid is distilled water.

Another feature of the invention resides broadly in a hydrogen pump comprising a hydrogen producing electrode; a hydrogen consuming electrode; a proton exchange member electrically connecting said hydrogen producing electrode to said hydrogen consuming electrode; and a gas space interposed between said hydrogen producing electrode and said consuming electrode. The hydrogen pump further comprises a power source connected to both of said hydrogen producing electrode and said hydrogen consuming electrode. The hydrogen producing electrode and hydrogen consuming electrode are identical.

A further feature of the invention resides broadly in a method of cooling an object comprised of: producing hydrogen gas in a cathodic space; consuming hydrogen gas in an anodic space; and contacting a cooling medium with said object said cooling medium absorbing heat from said object and transporting said heat away from said object, said step of transporting being accomplished by said step of producing and consuming respectively. The cathodic space includes a hydrogen electrode. The anodic space includes a hydrogen electrode. The respective hydrogen electrodes are electrically connected by a solid electrolyte. The solid electrolyte is a proton exchange membrane. The hydrogen electrodes are symmetrical.

BRIEF DESCRIPTION OF THE DRAWINGS

The invention is herein described, by way of example only, with reference to the accompanying drawings, wherein.

DETAILED DESCRIPTION OF THE PREFERRED EMBODIMENTS

The principles and workings of a hydrogen pump having hydrogen electrodes and a proton exchange membrane ("PEM") along with its use in an electrochemical heat exchanger can be better understood with reference to the drawings and the accompanying detailed description which describes possible embodiments of the hydrogen pump electrochemical heat exchanger according to the present invention.

Figure 1:
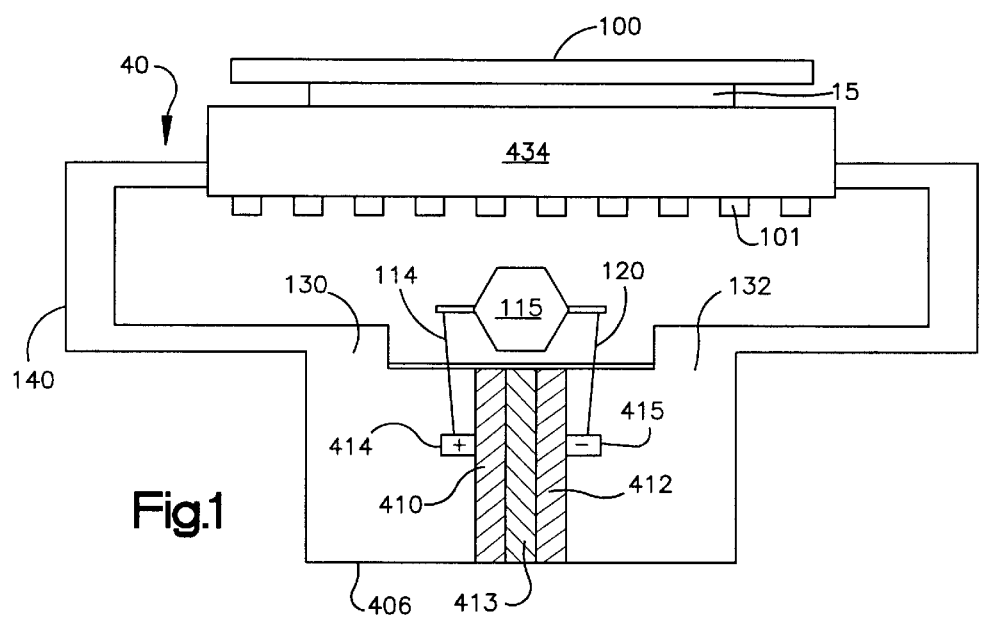
FIG. 1 is a schematic illustration of an electrochemical heat exchanger according to the present invention.

Turning to FIG. 1, the hydrogen electrodes 410, 412 and proton exchange membrane 413 form a membrane electrode assembly ("MEA"). The MEA is preferably made by laminating a mixture of carbon and platinum catalyst to both sides of membrane. It is preferable that the loading of the catalyst is in the range from 0.05 mg/cm$^2$ Pt up to about 1 mg/cm$^2$ Pt. The current density is preferably about 0.1–1 A/cm$^2$ under cell voltage equal 20–200 mV if hydrogen is to be produced on the one electrode and consumed on the other one.

Proton exchange membranes designed for fuel cells can be utilized in the present invention. These PEMs for fuel cells ("PEMFC") can contain catalysts for hydrogen production and consumption on both sides of membrane. The catalyst generally consists of a small amount of Pt mostly from 0.05 mg/cm$^2$ up to 1 mg/cm$^2$. With fuel cells, the respective sides of the membrane generally contain a slightly different catalyst, specifically for processes of hydrogen oxidation and oxygen reduction, which occur by operation of the fuel cell. Although unsymmetrical PEMs (e.g. PEMFCs) can be used in the present invention, it is preferable to use symmetrical hydrogen electrodes in the hydrogen pump of the present invention. "Symmetrical" means that both sides of a PEM contain substantially identical hydrogen electrodes. In this case an individual cell is designed to produce and consume hydrogen and to work as hydrogen pump. This cell can be called a Proton Exchange Membrane Hydrogen Pump ("PEMHP").

The preferred embodiment of the present invention utilizes symmetrical hydrogen electrodes. In this design, a hydrogen electrode is utilized as a cathode to produce hydrogen and the other to consume hydrogen (the anode). In between these two electrodes, it is preferable to utilize a proton exchange membrane ("PEM"). It is preferable that the proton exchange membrane placed between the anode and cathode is made of a polymer material having sulfonate functional groups contained on a fluorinated carbon backbone. Two such materials include a NAFION PEM having an equivalent weight of 1100 grams and a Dow experimental PEM (XUS-13204.20) having an equivalent weight of 800. NAFION is a sulfonic acid membrane sold by E.I. Dupont Company having a substantially fluorinated backbone and pendant groups according to the following structures:

(8)

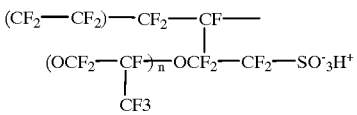

(9)

Both NAFION 117 (purchased from Aldrich Chemical Company) and NAFION 115 have equivalent weights of 1100 and thicknesses of 7 mils (175 μm) and 5 mils (125 μm), respectively. NAFION 105, 115 and 117 will each operate satisfactorily in the present invention, with NAFION 115 and 117 having a thicknesses of 7 mils (175 μm) and 5 mils (125 μm), respectively, and a conductivity of about 0.05 Ω$^{-1}$ cm$^{-1}$. NAFION 117 is the preferred NAFION product. The Dow Chemical PEM has a thickness in the dry state of 5 mils (125 μm) and a conductivity greater than 0.1 Ω$^{-1}$ cm$^{-1}$ as measured with an AC bridge at 10$^3$ Hz. The Dow membrane material is generally preferred because of its lower equivalent weight, higher conductivity and better water retention characteristics obtained in the resulting PEM.

In addition, it is anticipated that a sulfonated polymer having a nonfluorinated carbon backbone would be operable according to the present invention. Such a polymer might include polystyrene sulfonate. Additionally, such a material might be coated with a fluorinated material to increase its resistance to chemical attack. It is also anticipated that a proton exchange membrane made of a polymer material having carboxylate functional groups attached to a fluorinated carbon backbone would be operable according to the present invention. Examples include those available from Tokuyama Soda Company under the trademark "NEOSEPT-F", Asahi Glass Company under the trademark "FLEMION", Asahi Chemical Industry Company under the trademark "ACIPLEX-S", and Tosoh Corporation under the trademark "TOSFLEX IE-SA48." Further, polymeric systems based on: perfluoro bis-sulfonimides ($CF_3$-[$CF_2SO_2NHSO_2CF_2$]$_n$-$CF_3$); perfluoro phosphonic acids, and the corresponding carbanion acids would function satisfactorily as proton exchange membranes. The preferred PEMs contain perfluroinated sulphonic acids that display a very high resistance to chemical attack, such as NAFION 117 and NAFION 115.

PEM-impregnated gas diffusion electrodes can be hot-pressed onto both sides of a purified proton exchange membrane, using a Carver hot press, to produce a membrane and electrode assembly. The hot-pressing procedure usually involves placing a sandwich structure, consisting of the PEM and two electrodes-one at either side of the membrane—between the platens of the press at approximately 100 psi, where the platens having been previously heated to 100° C. After the temperature of the platens has been raised to within a preselected range of between 125° C. and 230° C., a preselected pressure in the range 1,000 psi to 50,000 psi is applied to the membrane and electrode assembly for a period of time varying from 15 seconds to 150 seconds. The hot pressed MEAs should be immediately removed from the hot press and mounted in an electrochemical cell.

It has been reported that at high current densities, most of the electrochemical reaction occurs near the front surface of the catalyzed electrodes, indicating that most of the current is localized in the outer catalyzed layers of electrodes. Therefore, to achieve high power densities, it is advantageous to localize a large fraction of the electrocatalyst material in the outer layers of fuel cell electrodes. Fuel cell performance has been observed to increase with increasing platinum (Pt) catalyst loading, reaching a maximum at a loading of 5 mg Pt per $cm^2$. Relatively thick platinum-catalyzed active layers in electrodes having a platinum loading of 10 mg Pt per $cm^2$ may have introduced mass transport overpotentials, which hindered high fuel cell performance.

FIG. 1 is a schematic illustration of an electrochemical heat exchanger 40 in accordance with one embodiment of the present invention. Electrochemical cell 402 includes a housing 406 which houses a first and second hydrogen electrodes 410, 412. A proton exchange membrane 413 separates the hydrogen electrode 410 and 412. Each of the electrodes 410 and 412 is connected to opposite ends of power supply 115 via terminals 414 and 415. Hydrogen gas produced by first hydrogen electrode 410 is passed through conduit 140 and heat exchange occurs with the element 100 to be cooled via heat exchange chamber 434. The hydrogen gas produced by first hydrogen electrode 410 is consumed by hydrogen electrode 412. Of course, the polarity of the electrodes 410 and 412 can be reversed.

An element 100 to be cooled is placed in thermal contact, for example, on a surface area 15 of the heat exchange chamber 434. Heat exchange chamber 434 is adapted to be disposed in heat exchange relationship with the element 100 to be temperature regulated. The surface area 15 is in thermal contact with the hydrogen being exchanged between the electrochemical cells. A hydrogen pressure differential is established between the first electrode 410 which produces hydrogen during the charge cycle; and the second electrode 412 which consumes hydrogen during discharge cycles. This pressure differential establishes an electrochemical pump which allows the hydrogen produced by electrode 410 to pass through chamber 434 and be consumed by electrode 412. As the hydrogen passes through chamber 434, it exchanges heat with the element 100 to be cooled. This effectively allows an element or item 100 to be cooled. It is important to note that there is no phase change involved, rather the heat transfer fluid, i.e., hydrogen, absorbs the heat, rapidly moves to the consuming cell, and dissipates the heat absorbed to a heat sink(s) 101 which may be located either on the heat exchange chamber or be located on the consuming cell.

Although not shown, it is possible to use a metal hydride compensating plate to compensate for hydrogen lost during leakage. The metal hydride compensating plate should be able to occlude hydrogen and is designed to occlude or disassociate hydrogen upon a loss of hydrogen below a predetermined level. Although hydrogen leakage generally is minor, without a source of compensation, it may cause serious problems. If hydrogen pressure drops as a result of hydrogen leakage, hydrogen will escape from metal hydride plate and will compensate a loss of hydrogen. The hydrogen capacity of the plate should be enough for compensation of hydrogen leakage during the life time of electrochemical heat exchanger 40. Assuming free gas volume of the electrochemical heat exchanger 40 is equal to $V(m^3)$ and average pressure is equal to P(Pa), the total number of hydrogen molecules in the gas space of electrochemical heat exchanger 40 is:

$$n = PV/RT \qquad (10)$$

Here: R is molar gas constant equal to 8.31 $Jmol^{-1} K^{-1}$, and T is Kelvin temperature. If the electrochemical heat exchanger 40 has a 50% hydrogen loss per year, total hydrogen lost during a five-year cycle life will be 250%. This means that the compensated metal hydride plate should contain at least 0.96875 PV/RT molecules hydrogen. If it is necessary to remove 100 watts heat, the free volume of the electrochemical heat exchanger 40 would be equal $3 \times 10^{-4} m^3$.

Figure 2:
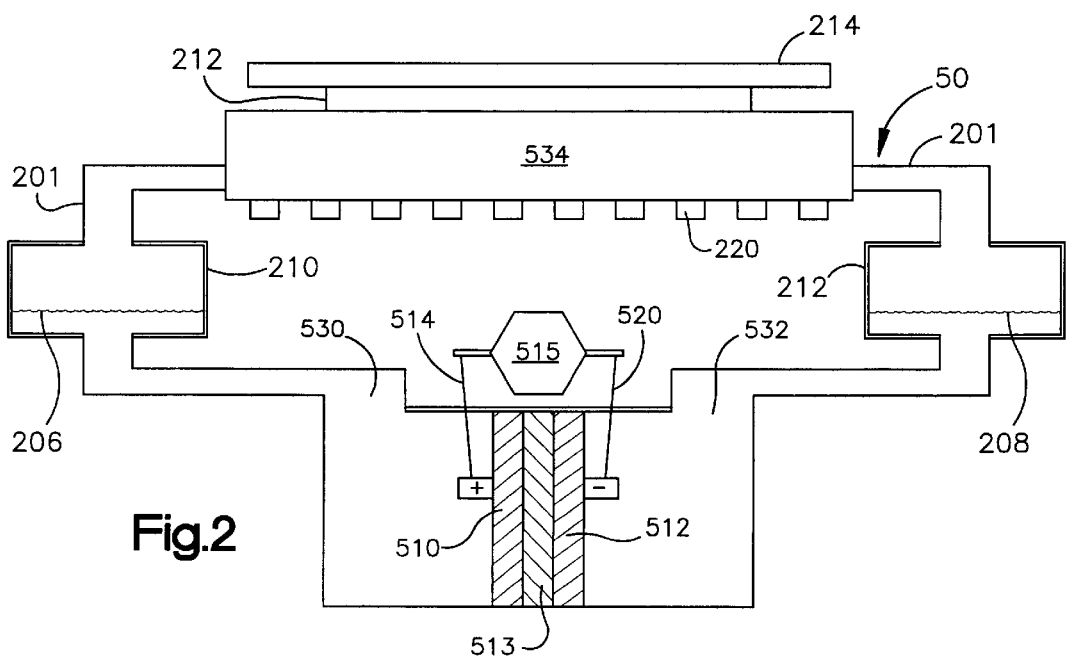
FIG. 2 is a schematic illustration of an electrochemical heat exchanger, wherein a fluid filled coolant may be used.

The embodiment of electrochemical heat exchanger 50 illustrated in FIG. 2 is similar to that described in FIG. 1. For convenience reference numerals indicating similar elements will remain the same as those used in FIG. 1. Power supply 515 is electrically connected to first hydrogen electrode 510 through lead 514 and to second hydrogen electrode 512 through lead 520. They are separated by a proton exchange membrane 513. Hydrogen gas produced by first hydrogen electrode 510 fills gas space (cathode gas space) 530 and forces liquid coolant membrane 206 to push or move a liquid coolant through or with heat exchange chamber 534. Hydrogen electrode 512 consumes the hydrogen within the anode gas space 532 which allows liquid coolant membrane 208 to move in response to the coolant moving through heat exchange chamber 534. Any organic liquid or mixture of organic liquid and water can be used as the heat carrier. A preferred approach is to use distilled water as a heat carrier. The primary reasons for this are that distilled water has maximum specific thermal capacity. Secondly, the contact of distilled water with the electrodes or the proton exchange membrane has no adverse effect on the operation parameters and therefore, if the distilled water were to contact either the anode or cathode gas space, little harm would be done.

The electrochemical heat exchanger 50 of FIG. 2 differs from that of FIG. 1 in that the conduit 201 contains a liquid or gas coolant such as water. Water has specific heat capacity equal to 4,217 $kJ kg^{-1} K^{-1}$, 300 times that of hydrogen (14.2 $kJ kg^{-1} K^{-1}$). The liquid coolant level 206, 208 moves in response to the pressure differential established between the respective hydrogen electrodes 510, 512. Liquid coolant levels 206, 208 indicate that the liquid contained in the conduit 201 is capable of being pushed back and forth through heat exchange chamber 534 and exchanges the heat present in the element 214 to be cooled through thermally conductive heat exchange plate 212. The heated liquid transports the heat absorbed and exchanges it with a heat sink 220 that may be located on either or both sides of the heat exchange chamber 534. It is also possible to incorporate a level sensor (not shown) to determine liquid position. This would permit the direction or intensity of the current to be regulated in response to the liquid coolant position. In this embodiment, it may be necessary to switch the polarity of the two cells 510, 512 in order to change the flow direction of the liquid coolant. The liquid coolant present in the conduit can be located below the gas spaces 530, 134 or be separated from gas spaces 530, 532 by a flexible membrane, for example.

The preferred electrochemical heat exchanger according to the present invention features a fully sealed construction and allows controlled production and consumption of hydrogen. The net product of overall reaction is heat. In comparison with fuel cell operation the present invention is advantageous because it does not produce water which has to be removed. Moreover, the operation with reversible polarity creates much less problems with local polarization and transportation of water.

Figure 3:
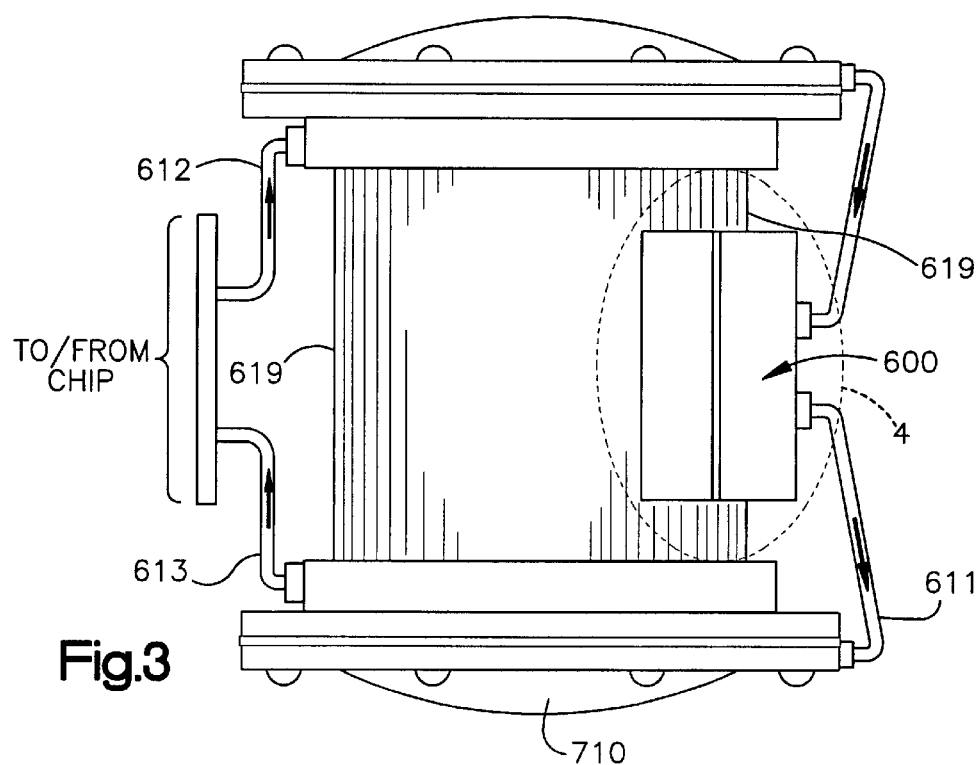
FIG. 3 is an illustration of a prototype of the present invention.
Figure 4:
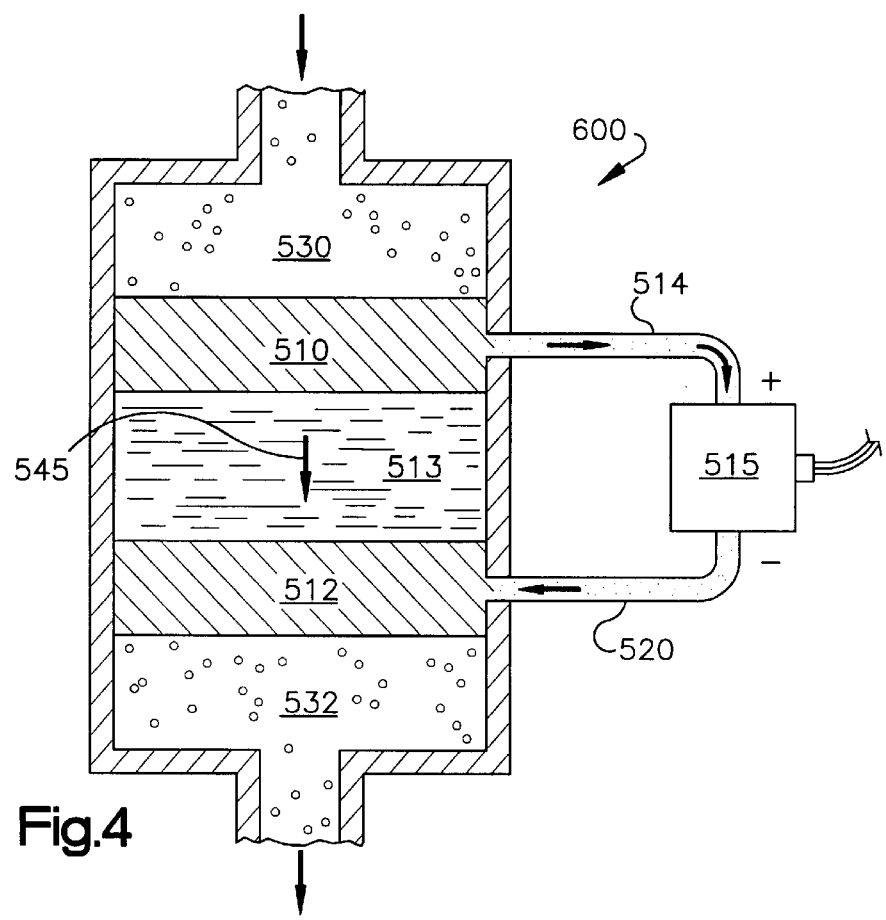
FIG. 4 is a cut-away schematic illustration of the heat pump of the present invention.

FIG. 3 illustrates a prototype electrochemical heat exchanger being utilized to cool a microchip (microchip not shown but in thermal contact with conduits 615, and 613). Conduits 615 and 613 contain a cooling liquid (e.g. water) which is being moved by hydrogen pump 600. FIG. 4 illustrates schematically the hydrogen pump 600 in cut-away view, wherein hydrogen gas is being consumed. For convenience, in FIG. 4 reference numerals indicating similar elements will remain the same as those used in FIG. 2. Power supply 515 is electrically connected to first hydrogen electrode 510 and second hydrogen electrode 512. The arrows in both 514 and 520 are meant to schematically represent the flow of electrons. Electrodes 510 and 512 are separated by proton exchange membrane 513. Similarly, the arrow 545 in the proton exchange membrane 513 represents the flow of protons across the membrane 513. Returning to FIG. 3, hydrogen gas produced in the hydrogen pump 600 fills hydrogen conduit 611, which in turn pushes or forces liquid through liquid conduit 613 into thermal contact with an item to be cooled (e.g. microchip not shown). Hydrogen electrode 512 consumes hydrogen which allows the water to move away from the item to be cooled and exchange the heat absorbed with heat sink tubes 619. Any organic liquid or mix of organic liquid and water can be used as a heat carrier. A preferred approach is to use distilled water as a heat carrier. The liquid coolant in the respective conduits 613 and 615 moves in response to the pressure differential established between the respective gas spaces 530, 532. The liquid contained in the conduits is capable of being pushed back and forth to exchange heat with the heat sink tubes 619. The direction and intensity of the current can be selectively regulated by the power source 515. To drive fresh water back and forth, the polarity of the two electrodes may be reversed which would change the direction of flow of the electrons, protons, and liquid. A water/hydrogen reservoir 710 is also provided.

Although this invention has been shown and described with respect to detailed embodiments thereof, it will be understood by those skilled in the art that various changes in form and detail thereof may be made without departing from the spirit and scope of the claimed invention.

What is claimed is:

1. An electrochemical heat exchanger comprised of:
   a first hydrogen electrode having a first gas space;
   a second hydrogen electrode having a second gas space; and
   a solid electrolyte electrically connecting said first and second hydrogen electrode, said first and second gas spaces being in communication with a heat exchange member.

2. The electrochemical heat exchanger of claim 1, wherein said heat exchange member is a chamber interposed between said first and second gas spaces.

3. The electrochemical heat exchanger of claim 1, wherein said solid electrolyte is a proton exchange membrane.

4. The electrochemical heat exchanger of claim 1, wherein said chamber is at least partially filled with a heat carrier.

5. The electrochemical heat exchanger of claim 4, wherein said heat carrier is liquid.

6. The electrochemical heat exchanger of claim 5, wherein said liquid is distilled water.

7. A hydrogen pump comprising
   a hydrogen producing electrode;
   a hydrogen consuming electrode;
   a proton exchange member electrically connecting said hydrogen producing electrode to said hydrogen consuming electrode; and
   a gas space interposed between said hydrogen producing electrode and said consuming electrode.

8. The hydrogen pump of claim 7, further comprising a power source connected to both of said hydrogen producing electrode and said hydrogen consuming electrode.

9. The hydrogen pump of claim 7, wherein said hydrogen producing electrode and hydrogen consuming electrode are identical.

10. A method of cooling an object comprised of
    producing hydrogen gas in a cathodic space;
    consuming hydrogen gas in an anodic space; and
    contacting a cooling medium with said object said cooling medium absorbing heat from said object and transporting said heat away from said object, said step of transporting being accomplished by said step of producing and consuming respectively.

11. The method of claim 10, wherein said cathodic space includes a hydrogen electrode.

12. The method of claim 11, wherein said anodic space includes a hydrogen electrode.

13. The method of claim 12, wherein said respective hydrogen electrodes are electrically connected by a solid electrolyte.

14. The method of claim 13, wherein said solid electrolyte is a proton exchange membrane.

15. The method of claim 12, wherein said hydrogen electrodes are symmetrical.

* * * * *